United States Patent
Carlsson et al.

(10) Patent No.: US 9,445,391 B2
(45) Date of Patent: Sep. 13, 2016

(54) AUTOMATIC DETECTION OF DEVICE TYPE FOR FILTERING OF DATA

(71) Applicant: Telefonaktiebolaget L M Ericsson (publ), Stockholm (SE)

(72) Inventors: Richard Carlsson, Stockholm (SE); Tomas Goldbeck-Löwe, Saltsjö-Boo (SE); Sky Zhao, Beijing (CN)

(73) Assignee: TELEFONAKTIEBOLAGET L M. ERICSSON, Stockholm (SE)

( * ) Notice: Subject to any disclaimer, the term of this patent is extended or adjusted under 35 U.S.C. 154(b) by 0 days.

(21) Appl. No.: 14/430,129

(22) PCT Filed: Sep. 21, 2012

(86) PCT No.: PCT/EP2012/068706
§ 371 (c)(1),
(2) Date: Mar. 20, 2015

(87) PCT Pub. No.: WO2014/044323
PCT Pub. Date: Mar. 27, 2014

(65) Prior Publication Data
US 2015/0237596 A1  Aug. 20, 2015

(51) Int. Cl.
H04W 64/00 (2009.01)
H04L 29/08 (2006.01)
H04L 12/26 (2006.01)
G06F 17/30 (2006.01)
H04W 8/02 (2009.01)

(52) U.S. Cl.
CPC ........ *H04W 64/006* (2013.01); *G06F 17/3087* (2013.01); *G06F 17/30867* (2013.01); *H04L 43/062* (2013.01); *H04L 67/18* (2013.01); *H04W 8/02* (2013.01)

(58) Field of Classification Search
None
See application file for complete search history.

(56) References Cited

U.S. PATENT DOCUMENTS

| | | | | |
|---|---|---|---|---|
| 2004/0003125 A1* | 1/2004 | Ichimura | ............... | G01S 5/0027 709/249 |
| 2012/0108261 A1* | 5/2012 | Miyake | ................. | H04W 4/028 455/456.1 |
| 2013/0012220 A1* | 1/2013 | Waris | ..................... | H04L 12/12 455/450 |

FOREIGN PATENT DOCUMENTS

EP   2 009 610 A2   12/2008

OTHER PUBLICATIONS

International Search Report and Written Opinion of the International Searching Authority, PCT Application No. PCT/EP2012/068706, Sep. 26, 2013.

Caceres et al, "Deriving origin-destination data from a mobile phone network", *IET Intell. Transp. Syst.*, 1(1):15-26, Mar. 12, 2007.

* cited by examiner

*Primary Examiner* — Leon-Viet Nguyen
(74) *Attorney, Agent, or Firm* — Patents on Demand P.A.; Brian K. Buchheit; Scott M. Garrett

(57) ABSTRACT

Methods are provided for filtering, collecting, and analyzing location data for a plurality of devices in a wireless network. Location data for one or more devices is received, for each device the location data includes a unique identifier. Whether the devices belong to the group of devices is determined based on the unique identifier. The location data of devices determined to belong to the group of devices are stored and used in the mobility analysis and the results distributed accordingly. A relevancy analysis may be performed on the stored location data of devices determined to belong to the group of devices in which device information is generated that is associated with devices not belonging to the group of devices. The device information is fed back to determine whether the devices belong to the group of devices based on the unique identifier.

24 Claims, 10 Drawing Sheets

AUTOMATIC DETECTION OF DEVICE TYPE FOR FILTERING OF DATA

CROSS REFERENCE TO RELATED APPLICATION

This application is a 35 U.S.C. §371 national stage application of PCT International Application No. PCT/EP2012/068706, filed on 21 Sep. 2012, the disclosure and content of which is incorporated by reference herein in its entirety. The above-referenced PCT International Application was published in the English language as International Publication No. WO 2014/044323 A1 on 27 Mar. 2014.

TECHNICAL FIELD

The present invention relates to methods and apparatus for filtering, collecting and analysing location data received for a plurality of devices in a wireless network. In particular, the invention relates to methods and apparatus for filtering location data for a plurality of devices in the wireless network and analysing location data for devices belonging to a group of devices that are relevant to the analysis.

BACKGROUND

All wireless network connected devices create a lot of data related to mobility of the devices, which data can be used in many application areas. It is understood that more connected "things" become the more data related to mobility of the device will be available. In particular, by collecting location data from all connected devices it is possible to construct models of how devices are being moved around, which can be used in many application areas, examples of which may include:
  tracking a vehicle fleet to detect and optimize usage;
  detect human travel patterns to plan transportation infrastructure;
  detect human travel patterns to plan advertising campaigns; and
  track a work force fleet to optimize routines and processing;

One potential source of data related to mobility is location tagged data from mobile networks. Devices connected through cellular technology are a rich source of mobility data as these devices are known to leave a lot of tracks throughout a mobile network and the network nodes of the mobile network. Mobile networks generate a very large amount of data. It is possible to build a system for collecting location data from mobile networks, analyse the location data, and expose it for use by different applications and services.

Wireless communication networks may comprise or represent any wireless network used for wireless communications with devices connected to the wireless network. Examples of wireless networks include, but are not limited to, wireless networks such as the Worldwide Interoperability for Microwave Access (WiMAX), wireless local area networks (WLAN) based on the Institute of Electrical and Electronics Engineers' (IEEE) 802.11 standards e.g. Wi-Fi networks, or wireless networks based on cellular or satellite technologies such as mobile networks, Global System for Mobile Communications (GSM), Wideband Code Division Multiple Access (W-CDMA), CDMA2000 or Long Term Evolution (LTE)/LTE Advanced mobile networks or any $2^{nd}$, $3^{rd}$ or $4^{th}$ Generation and beyond wireless networks.

The device(s) or connected device(s) may comprise or represent any device that is capable of connecting to or communicating over a wireless communication network. Examples of devices as described herein include, but are not limited to, wireless devices such as mobile phones, terminals, smart phones, satellite phones, portable computing devices such as lap tops, handheld devices, tablets, netbooks, computers, personal digital assistants, Global Positioning System (GPS) personal navigators, augmented reality glasses, credit card terminals, security devices, in-vehicle devices such as vehicle tracking systems or any other wireless communication device that is mobile and/or wireless devices such as sensors, smart meters or utility meters or any other wireless communication device that typically has a fixed location.

FIG. 1 illustrates an example data collection and analysis system 100 used for collecting location data of devices from a mobile network 101, analyses the location data and creates models of device mobility. The mobile network 101 collects data about the locations of all connected devices from one or more nodes or different sources in the mobile network 101. The data about the locations of all connected devices are sent from the mobile network 101 to a data collector apparatus 102. This location data from each device may include data representative of the device location, a timestamp, and a device identifier. The data collector apparatus 102 collects this location data from the different data sources and converts it into a uniform format suitable for analysis. The data collector apparatus 102 sends all of the uniformly formatted location data to a data analyzer apparatus 103 for mobility processing (e.g. mobility analysis). The analyzer apparatus 103 processes the location data and creates models of device mobility, which are sent to a data exposer 104 for storage and/or distribution for further processing or integration with other applications and services.

When the data collection and analysis system 100 is configured to capture data about human mobility, then the captured location data should only be associated with devices that are carried by humans (e.g. mobile phones, tablets, laptops, music players, cameras, GPS personal navigators, augmented reality glasses etc.) The location data generated by devices that are not carried by humans do not represent human movements and should not be used as a data source when building models of human mobility. When collecting location data from mobile networks the non-human devices generate a lot of data that if used will both risk making the mobility models in relation to devices carried by humans inaccurate and consume a lot of extra bandwidth and storage space.

The converse is also true. For example, when the data collection and analysis system 100 is configured to capture data about vehicle or fleet mobility, then the captured location data should only be associated with devices that are carried by vehicles of only a fleet of vehicles. The location data generated by devices that are not carried by vehicles or by the fleet of vehicles do not represent the relevant vehicle movements and should not be used as data sources when building models of vehicle mobility. When collecting location data from mobile networks the human devices generate a lot of data that if used will both risk making the mobility models for vehicles inaccurate and consume a lot of extra bandwidth and storage space.

System 100 could be designed to track the movement of any group of devices such as credit card terminals, security devices, specific types of vehicles, or any other type of connected device or object with a connected device attached to it. In all of these cases it is only interesting to follow a group of devices of a certain type. However, in many cases, information about the device type will not be provided by the data source. When collecting data from devices that are connected to a communication network (e.g. a mobile network 100) it is generally not possible to know what type of device the data comes from. The location data may come from the mobile phone of a subscriber, a smart meter in a house, a credit card reader, or any type of device that is connected to a mobile network 100.

In many scenarios only one or a few kinds of devices may be of interest. For example, only data from humans or data from vehicles may be required to analyse human or vehicle movements. Current mobile networks 100 provide connectivity to a wide variety of devices and in most cases only certain types of devices are of interest for gathering location data.

Collecting data from non-relevant devices creates a lot extra need for bandwidth and storage space. It also risks affecting the mobility analytics that is performed on the data. Therefore, there is a significant need to provide a mechanism for efficiently handling location data received from a variety of data sources and optimise the accuracy of the mobility models generates from the received location data.

SUMMARY

It has been recognised here that whilst there are certain mechanisms for collecting and analysing location data from wireless networks such as mobile networks, none of the relevant systems allow for collection of location data belonging specifically to groups of devices of certain types. The present invention provides the advantages of reducing the location information transmitted within the system, reducing the storage requirements to that of only the location information that is relevant to the mobility analysis, and to improve the accuracy of the mobility models generated from the relevant location information.

According to a first aspect of the present invention there is provided a method for filtering location data from a plurality of devices in a wireless network for use in a mobility analysis of a group of the devices. The method includes receiving location data from the devices, the location data from each device including a unique identifier. Determining the devices that belong to the group of devices based on the unique identifier. Forwarding the location data for those devices determined to belong to the group of devices to an analyser module for use in the mobility analysis.

As an option, determining the devices that belong to the group of devices further includes determining whether the devices are relevant to the mobility analysis based on the unique identifier.

Optionally, the method further includes maintaining a device database including a plurality of device records, wherein each device record indicates whether the device associated with the device record belongs to the group of devices. Additionally or alternatively, determining the devices that belong to the group of devices further includes querying the device database using the unique identifiers to determine the devices that belong to the group of devices.

As an option, maintaining the device database further includes receiving, from the analyser module, device information associated with one or more devices determined not to belong to the group of devices and/or is not relevant to the mobility analysis, and updating each device record associated with the device information to indicate the device associated with the device record does not belong to the group of devices and/or is not relevant to the mobility analysis. Alternatively or additionally, maintaining the device database further includes receiving, from the analyser module, device information associated with one or more devices determined to belong to the group of devices and/or are relevant to the mobility analysis, and updating each device record associated with the device information to indicate the device associated with the device record belongs to the group of devices and/or is relevant to the mobility analysis.

Optionally, maintaining the device database further includes receiving, from the analyser module, device information associated with one or more devices indicating whether the one or more devices are relevant to the mobility analysis of the group of devices, and updating each device record associated with the device information to indicate whether the device associated with the device record is relevant to the mobility analysis.

As an option, the step of determining includes identifying a device record associated with the unique identifier of the location data for the at least one device, and checking the identified device record indicates whether the associated device belongs to the group of devices and/or indicates whether the device is relevant to the analysis. Additionally or alternatively, determining includes identifying a device record associated with the unique identifier of the location data from each device, and checking the identified device record indicates whether the associated device is relevant to the mobility analysis of the group of devices.

Optionally, the method further includes analysing the received location data for each device to determine whether said each device can be associated with the group of devices, and updating the device database device records to indicate whether each device belongs to the group of devices and/or is relevant to the mobility analysis. This may further include updating the device record to indicate said each device does not belong to the group of devices when the analysis indicates said each device is not associated with the group of devices and/or is not relevant to the mobility analysis. Optionally, analysing the received location data includes analysing the device speed for each device to determine whether it is associated with the group of devices' device speeds.

As an option, the method includes storing the received location data for devices found to belong in the group of devices and/or found to be relevant to the mobility analysis.

Optionally, the method may further include performing a statistical analysis on the stored received location data to further determine whether the corresponding devices belong to the group of devices and/or are relevant to the analysis. Additionally, maintaining device records associated with devices determined not to belong to the group of devices and/or not relevant to the mobility analysis based on the statistical analysis.

As an option, each device record associated with a device not relevant to the mobility analysis and/or not belonging to the group of devices includes a timestamp indicating when the device record indicated the associated device does not belong to the group of devices or is not relevant to the mobility analysis. Maintaining the device database further includes updating each device record to indicate the associated device belongs to the group of devices and/or is relevant to the mobility analysis after a predetermined period of time has elapsed. Optionally, updating each device record indicating an associated device belongs to the group of devices and/or is relevant to the mobility analysis is performed when it is determined the associated device has moved.

According to a second aspect of the present invention there is provided a method for analysing collected location data for a plurality of devices in a wireless network for use in a mobility analysis of a group of the devices. The method includes maintaining a location database including a plurality of device location records, where each device location record includes location data of a device belonging to the group of devices. Receiving and storing location data for devices determined to belong to the group of devices in the location database. Performing, according to a first schedule, the mobility analysis based on the location data stored in the location database to generate mobility analysis results for the devices found to be relevant to the group of devices.

As an option, the method includes performing, according to a second schedule, a calculation of the distance each device has moved based on the location data stored in the location database, and comparing the calculated distance for each device with a distance threshold to determine whether each device belongs to the group of devices and/or is relevant to the mobility analysis. Transmitting, to a data collection device maintaining a device database, device information associated with one or more devices determined not to belong to the group of devices and/or not relevant to the mobility analysis. The device database includes a plurality of device records, each device record indicates whether the device associated with the device record belongs to the group of devices and/or is relevant to the mobility analysis, where the device information is for use in updating device records associated with the device information.

As an option, the first and second schedules are arranged such that performing a calculation of the distance each device has moved is performed less frequently than performing the mobility analysis to generate mobility analysis results. Additionally or alternatively, performing the mobility analysis to generate mobility analysis results includes creating mobility models based on the location data stored in the location database. As an option, the mobility models created include a plurality of origination/destination matrices derived from the stored location data. As an option, the method includes forwarding the mobility analysis results for further distribution or use by applications and/or services.

Preferably, the group of devices includes devices relating to one or more specific device types that are relevant to the mobility analysis. The specific device type may include at least one of a device carried by humans, and a device carried by non-stationary vehicles, and stationary devices.

According to a third aspect of the invention there is provided a method for collecting and analysing location data for a plurality of devices in a wireless network for use in a mobility analysis of a group of the devices. The method includes receiving location data for one or more of the devices, where the location data for each device includes a unique identifier. Determining the devices that belong to the group of device based on the unique identifier, performing the mobility analysis based on the location data of devices determined to belong to the group of devices to generate mobility analysis results, and forwarding the mobility analysis results for further distribution.

Optionally, the method further includes maintaining a device database including a plurality of device records, where each device record indicates whether the device associated with the device record belongs to the group of devices. Maintaining a location database including a plurality of device location records, where each device location record includes location data of a device determined to belong to the group of devices for use in the mobility analysis. The step of determining further includes determining from the device database the devices that belong to group of devices based on the device identifier. The step of performing the mobility analysis further comprises performing the mobility analysis based on the location data stored in the location database.

As an option, the method includes performing a relevancy analysis on the plurality of device location records to determine whether the associated devices belong to the group of devices. The step of maintaining the location database further includes removing each device location record associated with a device determined not to belong to the group of devices. The step of maintaining the device database further includes updating each device record associated with a device determined not to belong to the group of devices.

As an option, the step of performing a relevancy analysis further includes periodically performing a calculation of the distance each device has moved based on the location data stored in the location database, and comparing the calculated distance for each device with a distance threshold to determine whether the one or more devices belong to the group of devices.

According to a fourth aspect of the invention there is provided an apparatus for filtering location data for a plurality of devices in a wireless network for use in a mobility analysis of a group of the devices. The apparatus including a receiver, a transmitter, a processor and memory, the processor being connected to the receiver, transmitter and memory. The receiver is configured to receive location data for one or more of the devices, where the location data for each device includes a unique identifier. The processor is further configured to determine the devices that belong to the group of devices based on the unique identifiers. The transmitter is configured to forward the location data for devices that are determined to belong to the group of devices to an analysis apparatus for performing the mobility analysis.

As an option, the receiver is further configured to receive, from the analyser apparatus device information associated with one or more devices determined not to belong to the group of devices. The processor is further configured to use the device information in determining whether the devices belong to the group of devices based on the unique identifiers.

Optionally, the processor is further configured to maintain a device database including a plurality of device records, wherein each device record indicates whether the device associated with the device record belongs to the group of devices. Alternatively or additionally, the processor is further configured to query the device database using the unique identifiers to determine the devices that belong to the group of devices. The receiver is further configured to receive, from the analyser module, device information associated with whether one or more devices belong to the group of devices. The processor is further configured to update each device record associated with the device information to indicate whether the device associated with the device record belongs to the group of devices.

According to a fifth aspect of the invention there is provided an apparatus for analysing collected location data for a plurality of devices in a wireless network for use in a mobility analysis of a group of the devices. The apparatus including a receiver, a transmitter, a processor and memory, the processor being connected to the receiver, transmitter and memory. The receiver is configured to receive and store location data for devices determined to belong to the group of devices. The processor is configured to perform the mobility analysis based on the stored location data to generate mobility analysis results for the devices found to belong to the group of devices. The transmitter is configured to forward the mobility analysis results for further distribution or use by applications or services.

As an option, the processor is further configured to perform a relevancy analysis on the stored location data for devices determined to belong to the group of devices, and the transmitter is further configured to transmit device information associate with one or more devices determined not to belong to the group of devices. Optionally, the processor is further configured to maintain a location database including a plurality of device location records, wherein each device location record includes location data of a device that belongs to the group of devices. The receiver is further configured to store the location data for devices determined to belong to the group of devices in the location database. The processor is further configured to perform the mobility analysis based on the stored location data in the location database to generate mobility analysis results for the devices found to belong to the group of devices.

As a further option, the processor is further configured to perform a calculation of the distance each device has moved based on the location data stored in the location database and compare the calculated distance for each device with a distance threshold to determine whether one or more devices belong to the group of devices. The transmitter is further configured to transmit, to the apparatus for filtering, device information associated with whether one or more devices are determined not to belong to the group of devices, the device information for use by the apparatus in determining the devices that belong to the group of devices based on the unique identifier.

According to a sixth aspect of the invention there is provided an apparatus for filtering and analysing location data for a plurality of devices in a wireless network for use in a mobility analysis of a group of the devices. The apparatus including a receiver, a transmitter, a processor and memory, the processor being connected to the receiver, transmitter and memory. The receiver is configured to receive location data for one or more of the devices, where the location data for each device includes a unique identifier. The processor is further configured to determine the devices that belong to the group of devices based on the unique identifier, store the location data for devices that belong to the group of devices, perform the mobility analysis based on the stored location data to generate mobility analysis results for the group of devices. The transmitter is configured to forward the mobility analysis results for further distribution.

As an option, the processor is further configured to maintain a device database including a plurality of device records, wherein each device record indicates whether the device associated with the device record belongs to the group of devices. Determine from the device database the devices that belong to the group of devices based on the unique identifier. Maintain a location database including a plurality of device location records, where each device location record includes location data of a device determined to belong to the group of devices for use in the mobility analysis. Perform the mobility analysis based on the location data stored in the location database. Perform a relevancy analysis on the plurality of device location records to determine whether the associated devices belong to the group of devices. Remove from the location database each device location record associated with a device determined not to belong to the group of devices. Update each device record to indicate whether the associated devices belong to the group of devices.

The invention provides the advantage of allowing location data from a wireless network to be selected or filtered for groups of devices for use in a mobility analysis of the location data relevant for each group of devices. The invention reduces the amount of location information that needs to be transmitted from the data collector apparatus (or wireless network), which consumes less bandwidth in the network. The invention also reduces the storage requirements of the location information for data filtering, collection and analysis. The invention reduces the amount of analysis required and minimizes processing time as only the location data relevant to the group of devices is analysed. In addition, the results output by the mobility analysis such as mobility models generated use less input location data from non-relevant sources resulting more accurate mobility models and/or results.

BRIEF DESCRIPTION OF THE DRAWINGS

In order that the invention may be more fully understood, some of the embodiments of the invention will now be described, by way of example only, with reference to the accompanying drawings, in which.

DETAILED DESCRIPTION

In order to overcome the problems identified above with present location data collection and analysis systems, methods and apparatus are described for use in handling location data generated from multiple sources and wireless networks (e.g. mobile networks) for use in mobility analysis. The basic concept of the invention is to provide a mechanism for only collecting data from devices or group(s) of devices that are of interest for a mobility analysis that is to be performed. For example, this may be achieved by receiving device data from the wireless network from a plurality of devices and discarding all data that is from a device(s) that are determined not to belong to a group(s) of devices to be analysed and/or the device(s) are not of interest or not relevant to the mobility analysis. In addition, to assist the determination of whether a device belongs to the group(s) of devices and/or is relevant to the mobility analysis, the movement pattern of the device from which location data has been collected is analysed to determine whether the device is of interest (e.g. by looking at which devices have been moved between many different locations). Each device that has been detected not to belong to the group of devices and/or not to be of interest or relevant to the mobility analysis is recorded or stored for use in the determination when data relating to that device is received again.

Figure 1:
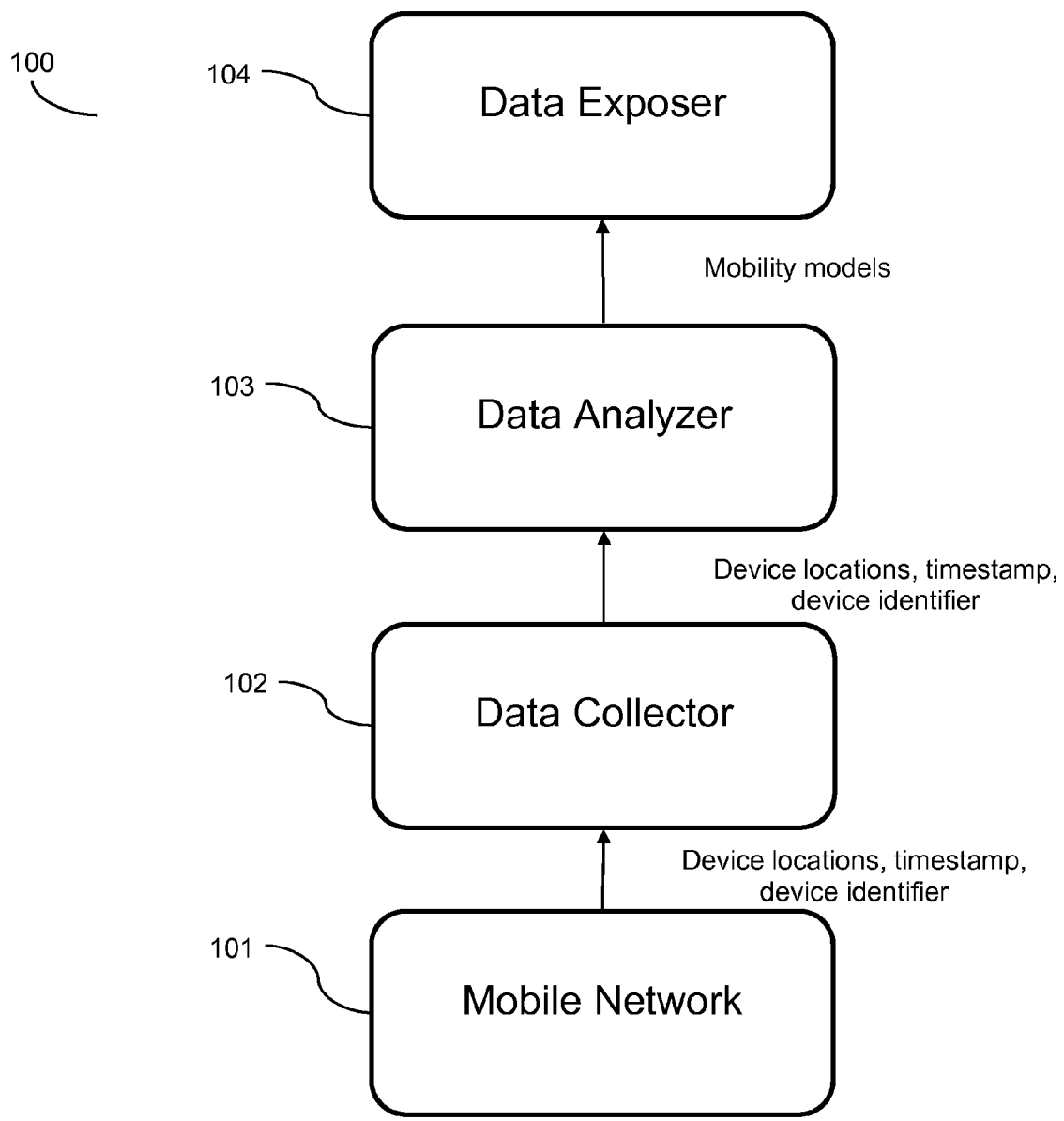
FIG. 1 is a schematic illustration of a conventional system for collecting and analysing location data.
Figure 2:
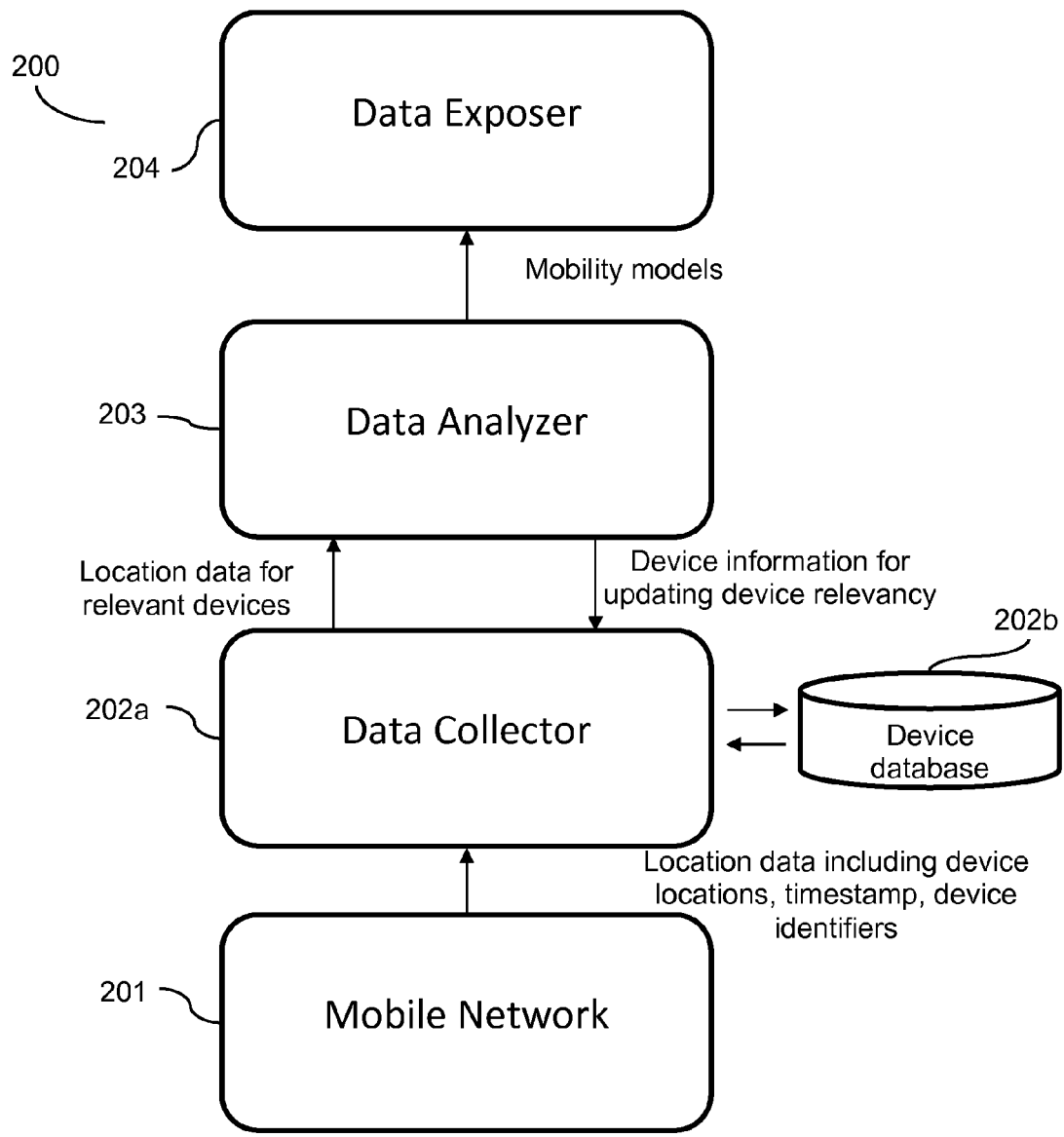
FIG. 2 is a schematic illustration of an example data collection and analysis system according to the invention.

FIG. 2 is a schematic illustration of the basic components of an example data collection and analysis system 200 according to the invention. The system 200 filters and collects location data from mobile networks 201 and creates models of device mobility based on a mobility analysis on a group(s) of devices. Mobile network 201 is used, by way of example only, and it is to be appreciated that any suitable wireless network may be used for collecting and analysing location data. As mentioned previously, the group of devices may include all devices of a particular device type—e.g. devices carried by humans such as mobile phones or devices carried by vehicles e.g. GPS tracking systems or in vehicle mobile systems. The system 200 includes a data collector 202a for receiving data from the mobile network 201, where the data collector 202a is in communication with a device database 202b. The data collector 202a is in communication with a data analyser 203, which performs the mobility analysis on the received collected data. The analyser 203 is also in communication with a data exposer 204, which receives the results of the mobility analysis (e.g. mobility models etc) for use by third parties or various applications.

In particular, mobile network 201 collects data about the locations of all connected devices from one or more nodes in the network 201 and sends this data to the data collector 202a. All the connected devices may include all non-stationary and/or stationary devices that connect with the mobile network 201 such that location data is generated. Location data is generally generated by the mobile network 201 based on messages received from the connected devices. In this example, the location data for each device includes data representative of the device locations, a timestamp, and a unique identifier (e.g. this may be any data that can be used to identify the location data for a particular device). Data collector 202a collects the location data from the different data sources (or devices) and converts it into a uniform format. The Data collector 202a processes the location data to determine which portions of the location data are the most relevant for further analysis of each of the groups of devices. The data collector 202a determines for each group of devices whether the devices belong to the group of devices based on the unique identifier. If the device belongs to a group of devices, then the location data for that device is relevant for the mobility analysis.

In this example, the data collector 202a queries a list of devices or a device database 202b using the unique identifier to determine whether the device associated with the location data belongs to a group of devices and whether the location data for the device is relevant for the mobility analysis. The list of devices or device database may include a relevancy indicator or a group identifier indicating whether the device belongs to the group and/or whether any location data for the device is relevant to the mobility analysis. The data collector 202a sends the location data for only those devices found to belong to the group of devices and/or location data relevant for the mobility analysis to a data analyzer for processing (e.g. mobility analysis). This location data may be in a uniform format and includes data representative of device locations, timestamps and unique identifiers.

Data analyzer 203 processes the location data received from the data collector 202a and creates models of device mobility. It is apparent that the received location data only includes location data for devices that the data collector 202a determined belong to the group of devices and are relevant for the mobility analysis. In addition, based on the received location data from the data collector 202a, the data analyzer 203 also detects devices of unwanted type that do not belong to a group of devices for the mobility analysis, and/or that are no longer considered relevant for the mobility analysis. The data analyzer 203 feeds back to the data collector 202b device information associated with the devices of unwanted device type or non-relevant devices to the data collector 202a for use in updating the list of devices or device database 202b. After processing, the data analyzer 203 sends the result of the mobility analysis (e.g. mobility models) based on location data of devices that belong to the group of devices and the location data is relevant to the analysis to the data exposer 204. Data exposer 204 stores the mobility models for distribution and/or integrates them with third parties such as other applications and/or services.

Figure 3:
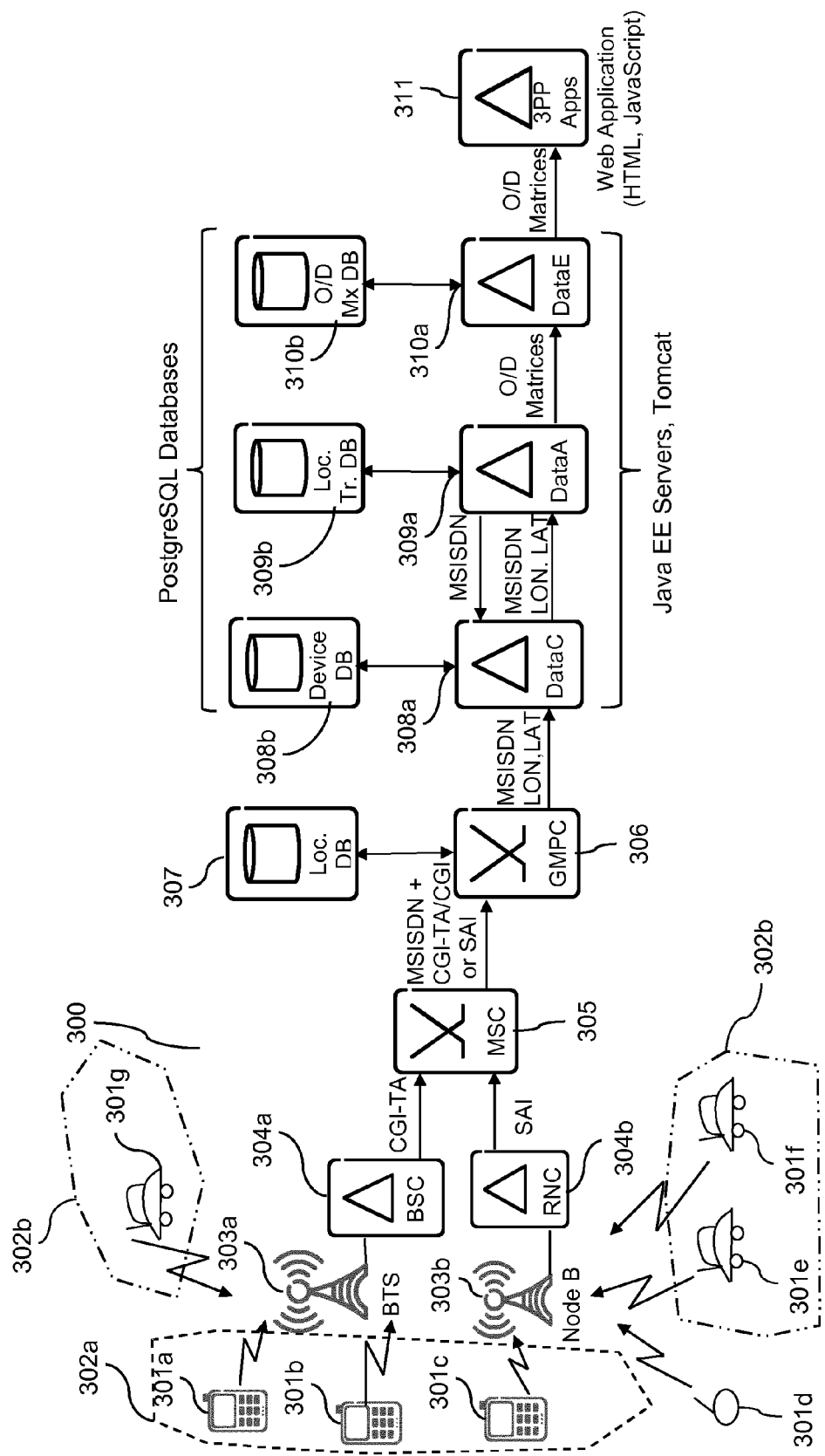
FIG. 3 is another schematic illustration of an example mobile network including another example data collection and analysis system according to the invention.

FIG. 3 is another schematic illustration of a mobile network 300 including another example data collection and analysis system 308a-310a according to the invention. It is apparent that mobile network 300 may include several different mobile networks, for example a 2G mobile network such as a Global System for Mobile Communications (GSM) based mobile network and a 3G mobile network Universal Mobile Telecommunications System (UMTS) based mobile network. It is to be appreciated that mobile network 300 may include other wireless networks such as WiFi, WiMAX or other legacy mobile networks, and 4G and beyond mobile networks such as Long Term Evolution (LTE)/LTE Advanced mobile networks or any future mobile network. The data collection and analysis system is illustrated by central nodes 308a-310b and receive location data from the mobile network(s) 300 to create mobility analysis results such as origin-destination matrices that describe subscriber travel patterns while at the same time filtering out data from devices of subscribers that do not belong to a group of devices and/or are not relevant to the mobility analysis of the group of devices.

In particular, the mobile network 300 includes a first group of devices 302a such as mobile or non-stationary devices 301a-301c (e.g. mobile phones held by humans), a stationary device 301d (e.g. a remote sensor or utility meter), and a second group of mobile or non stationary devices 301e-301g (e.g. mobile devices held by vehicles). The devices 301a-301g are in communication with the mobile network 300 via base station 303a, which is illustrated as a base transceiver station (BTS) of a GSM based mobile network, and base station 303b, which is illustrated as a Node B of a UMTS based mobile network. The base stations 303a and 303b are in communication with a mobile switching center (MSC) 305 via a base station controller (BSC) node 304a and a radio network center node 304b, where MSC 305 receives data from devices 301a-301g. MSC 305 is in communication with a gateway mobile positioning center server (GMPC) 306, which receives the data from devices 301a-301g and generates, using location database 307a, location data for each of the devices 301a-301g. The location data is forwarded to the central nodes 308a-310a of the data collection and analysis system for processing in accordance with the invention.

For simplicity, the system 308a-310b as described in FIG. 3 will operate on data received from the first group of devices 302a, which are non-stationary devices typically held by humans, to produce mobility models of human mobility. However, it is to be appreciated that the system 308a-310b may also operate on data from the second group of devices 302b, which are non-stationary devices typically held by vehicles such as a fleet of vehicles, or even a combination of these types of devices (not shown).

In operation, events generated from devices 301a-301g in the mobile network 300 are captured by the BSC and RNC nodes 304a and 304b and forwarded to the MSC 305. The events carry information about which cells of the mobile networks 300 the events were generated in and also may include a unique identifier (e.g. a subscriber id) for the device that generated the event. The events can also contain a timing advance (TA) value that can be used to estimate a location of the device. Generally, the events contain no information about the type of device that has generated the event. The events may include any message received from the devices 301a-301g, which are later converted into location data for each of the devices 301a-301g. By way of example only, network events generated by devices 301a-301g may include, but are not limited to, events based on:

Mobile Originating Traffic;
Mobile Terminating Traffic;
Normal Location Update;
Periodic Location Update;
Location Updating and International Mobile Subscriber Identity (MI)/General
packet radio service (GPRS) Attach;
IMSI/GPRS Detach;
IMSI Attach;
IMSI Detach;
Short Message Service (SMS) Originating Traffic;
SMS Terminating Traffic;
Mobile-originated (MO) Supplementary Services Procedure; and
Mobile-terminated (MT) Supplementary Services Procedure.

The events collected by the MSC node 305 are forwarded to the GMPC server 306, which uses the information in the events and the location database 307 containing cell tower locations to estimate the geographical location of the devices 301a-301g that generate the events.

The GMPC server 306 sends location data of the estimated devices locations to the data collector node 308a (DataC). For each device 301a-301g that generated an event, the location data includes a unique identifier such as a subscriber-id, user identifier or user-id (e.g. an MSISDN) and data representing the estimated location e.g. longitude and latitude (LON and LAT). The data collector node 308a receives the location data and for each device the data collector node 308a uses the unique identifier (e.g. MSISDN) in a query to a device database 308b to check if the associated device belongs to a group of devices 302a or 302b and has been marked as relevant or non-relevant to the mobility analysis of the group of devices 302a or 302b. If it has not been marked as non-relevant and the device belongs to a group of the devices 302a or 302b the location data for only those devices considered, by data collection node 308a, to belong to a group of devices 302a or 302b and are relevant to the mobility analysis is forwarded to the data analyser node 309a.

The data analyzer node 309a receives the location data for only those devices determined to belong to a group of devices 302a or 302b and is relevant to the mobility analysis from the data collector node 308a and stores all the received location data as location trace information in a location trace database (Loc. Tr. DB) 309b. The data analyser node 309a performs a mobility analysis on the stored location data associated with a group of the devices 302a or 302b according to a mobility analysis schedule.

The mobility analysis schedule may be a periodic schedule (e.g. the analysis is performed every X hours (e.g. X may be set to 24 hours)), an aperiodic schedule, a dynamic schedule depending on the load on the data analyser node 309a, or any other schedule or combination thereof. In addition, the mobility analysis may also be scheduled to calculate a mobility model associated with the group of devices 302a or 302b for various analysis intervals since the last analysis. Based on the mobility analysis schedule, the data analyzer node 309a retrieves the location trace information associated with a group of devices 302a or 302b and performs the mobility analysis. The mobility analysis calculates mobility models associated with retrieved location data of the group of devices 302a or 302b. As an example, the mobility analysis schedule may schedule the mobility analysis to be performed periodically every 24 hours and for the mobility analysis to calculate mobility models associated with the groups of devices 302a or 302b for an analysis interval of each hour in the past 24 hours.

As illustrated, the mobility models are Origin-destination matrices (O/D matrices), which are output to the data exposer node (DataE) 310a. Data exposer node 310a stores the O/D matrices in an O/D matrix database (O/D Mx DB) 310b and makes them available for access by or distribution to third parties, users or applications and services.

In addition, in this example, the data analyser node 309a may perform a device relevancy analysis according to a relevancy analysis schedule. The relevancy analysis schedule may be a periodic schedule (e.g. the analysis is performed every Y hours (e.g. Y may be set to 72 hours)), an aperiodic schedule, a dynamic schedule depending on the load on the data analyser node 309a, or any other schedule or combination thereof. According to the relevancy analysis schedule, the data analyser node 309a performs a relevancy analysis process that determines whether the devices associated with the stored location trace data still belong to the group(s) of devices 302a or 302b and/or are still relevant for use in the corresponding mobility analysis.

As an example, the data analyser node 309a may use a distance calculation to determine whether the devices move according to the expectations of the group of devices 302a or 302b. For example, the data analyser node 309a may calculate the total distance that each device has been moved since the last relevancy analysis or according to the relevancy analysis schedule (e.g. the total distance that each device has been moved during 72 hours). Each device that has moved less than a predetermined threshold distance since the last relevancy analysis is determined to be a device not relevant to the corresponding mobility analysis or does not belong to the group of devices 302a or 302b under analysis.

For example, each device in the first group of devices 302a are non-stationary devices that are carried by humans, so the predetermined threshold distance for this group of devices 302a may be set to a distance that typically indicates human movement e.g. 1000 m. In another example, each device in the second group of devices 302b are non-stationary devices that are carried by vehicles, so the predetermined threshold distance for this group of devices 302b may be set to a distance that typically indicates vehicular movement e.g. 3 km. To reduce the computational load on the data analyser node 309a, the mobility analysis may be scheduled to occur more frequently than the relevancy analysis.

Based on the relevancy analysis, the data analyser node 309a sends device information of all the devices that are determined as not belonging to the group of devices 302a or 302b and/or are not relevant to the corresponding mobility analysis. The device information may include the unique identifiers (e.g. MSISDNs) of these devices. For example, the devices may be considered not to belong in the first group of devices 302a, which are devices carried by humans or the devices may be considered not to belong in the second group of devices 302b, which are devices carried by vehicles. The device information is sent to the data collector node 308a, which uses the device information to update the list of devices or device database 308b and stores these devices as not belonging to a group of devices 302a or 302b and/or are not relevant to the corresponding mobility analysis. Although these devices may send further location events that generate location data, the location data associated with these devices that is received by the data collection node 308a will now be discarded (i.e. filtered out) by the data collection node 308a.

The data collection and analysis system as described above produces O/D matrices that can be used by public transportation operators to plan their operations with increased understanding of human or vehicle mobility. The present invention provides the advantages of mote accurate mobility analysis results such as more accurate O/D matrices because the location data from non-relevant devices are discarded prior to the data analyser node 309a performing the mobility analysis. In addition, there is a reduction in storage of location information as less information needs to be stored in the location trace database 309b, and less storage space and bandwidth is also required for sending location information between nodes 308a, 309a and 310a and the corresponding databases 308b, 309b and 310b.

Figure 4A:
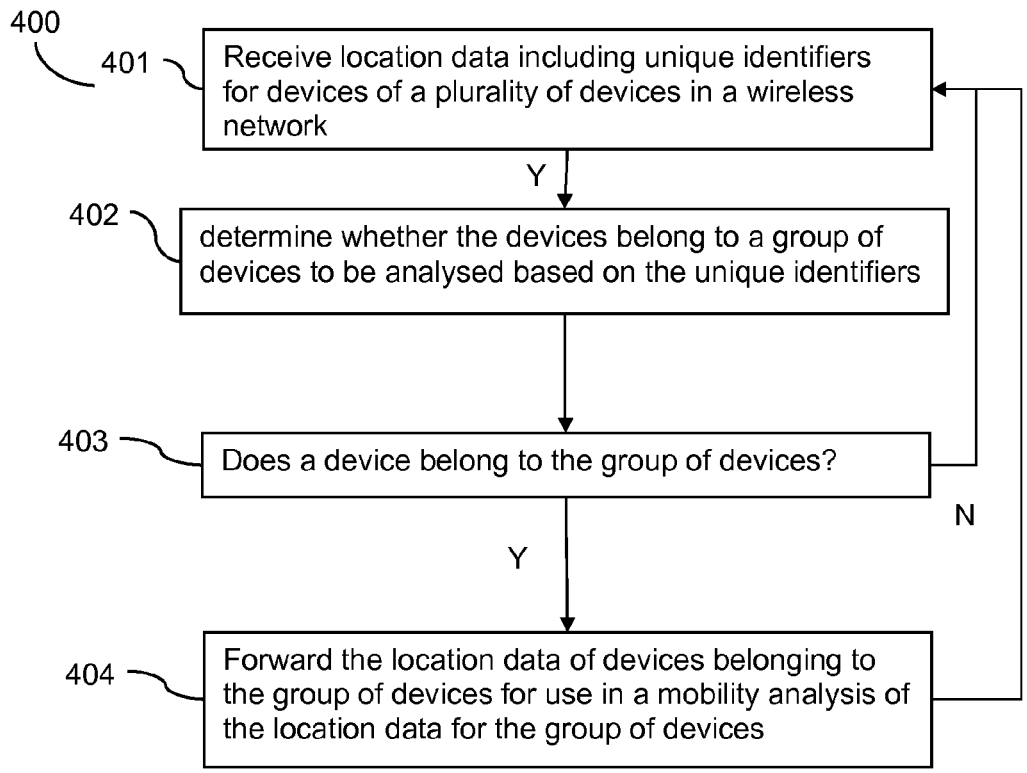
FIG. 4a is a flow diagram illustrating an example process for collecting location data according to the invention.

FIG. 4a is a flow diagram illustrating an example process 400 for filtering and collecting location data from a plurality of devices in a wireless network (e.g. a mobile network) for use in a mobility analysis of a group of the devices. The process 400 is a method of operating a data collection apparatus such as, for example, data collection node 308a or 601 when collecting location data from the plurality of devices, the steps performed are as follows:

401. Receive location data including unique identifiers for one or more devices of the plurality of devices in the wireless network. Proceed to step 402.
402. Determine whether the devices belong to a group of devices based on the unique identifiers. Determining the devices that belong to the group of devices may include determining whether the devices are relevant to the mobility analysis based on the unique identifier. This may include looking up a device list. This may also include querying a device database using the device identifier to determine whether the corresponding device belongs to the group of devices. The device database may send an indication of whether the device belongs to the group of devices; the indication may depend on whether the location data for the device is relevant to the mobility analysis performed for the group of devices.
403. Does a device belong to the group of devices? If yes, then proceed to step 404. It is to be appreciated that a device belonging to the group of devices is a device or device type that is relevant to the mobility analysis performed on the group of devices. Otherwise, proceed to step 401, e.g. discard the location data for devices not belonging to the group of devices and/or are not relevant to the corresponding mobility analysis and proceed to step 401 for receiving further location data.
404. Forward the location data for devices determined to belong to the group of devices and/or devices that are relevant to the mobility analysis for the group of devices for use in the mobility analysis of the location data for the group of devices.

Step 402 and 403 may further include identifying a device record associated with the unique identifier of the location data from each device, and checking the identified device record indicates whether the associated device belongs to the group of devices. Alternatively or additionally, steps 402 and 403 may include identifying a device record associated with the unique identifier of the location data from each device, and checking the identified device record indicates whether the associated device is relevant to the mobility analysis of the group of devices.

Figure 4B:
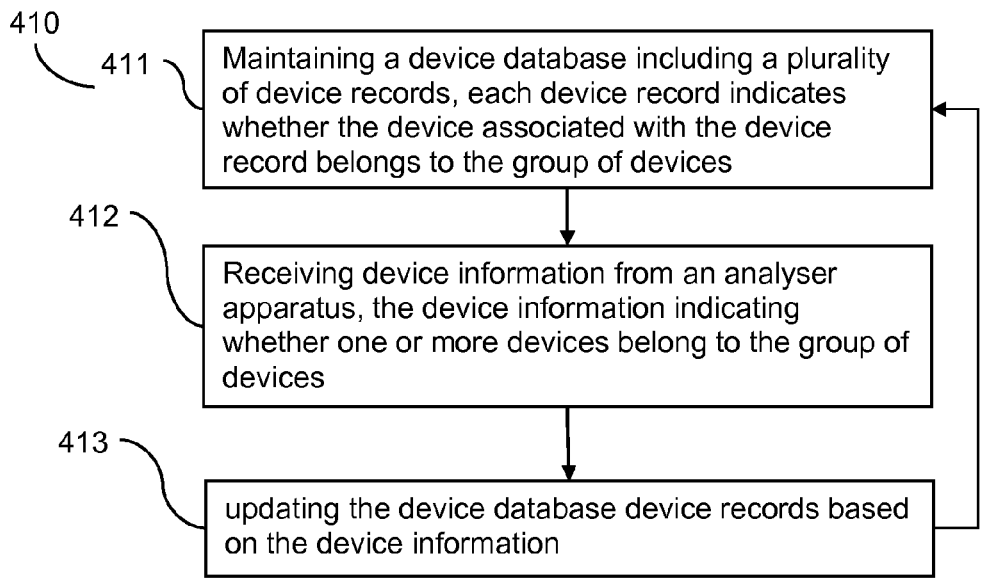
FIG. 4b is a flow diagram illustrating an example process for maintaining a device database according to the invention.

FIG. 4b is a flow diagram illustrating an example process 410 for use in maintaining a device database that may be used process 400. The process 400 is a method of operating a data collection apparatus such as, for example, data collection node 308a or 601 in maintaining or updating a device database when collecting location data according to process 400, the steps performed are as follows:

411. Maintaining a device database including a plurality of device records, where each device record indicates whether the device associated with the device record belongs to the group of devices and/or is relevant to the corresponding mobility analysis. Proceed to step 412.
412. Receiving device information from an analyser apparatus or node, the device information indicating whether one or more devices belong to the group of devices. The device information may include information associated with devices determined, by the analyser apparatus, not to belong to the group of devices and/or not relevant to the corresponding mobility analysis. Additionally or alternatively, the device information may include information associated with one or more devices determined to belong to the group of devices and/or relevant to corresponding mobility analysis. Proceed to step 413.
413. Updating the device database device records based on the device information. This may include updating the device record to indicate the device associated with the device record does not belong to the group of devices and/or is not relevant to the corresponding mobility analysis. Additionally or alternatively, this may include updating each device record associated with the device information to indicate the device associated with the device record is relevant to the group of devices and/or is relevant to the corresponding mobility analysis of the group of devices.

Figure 4C:
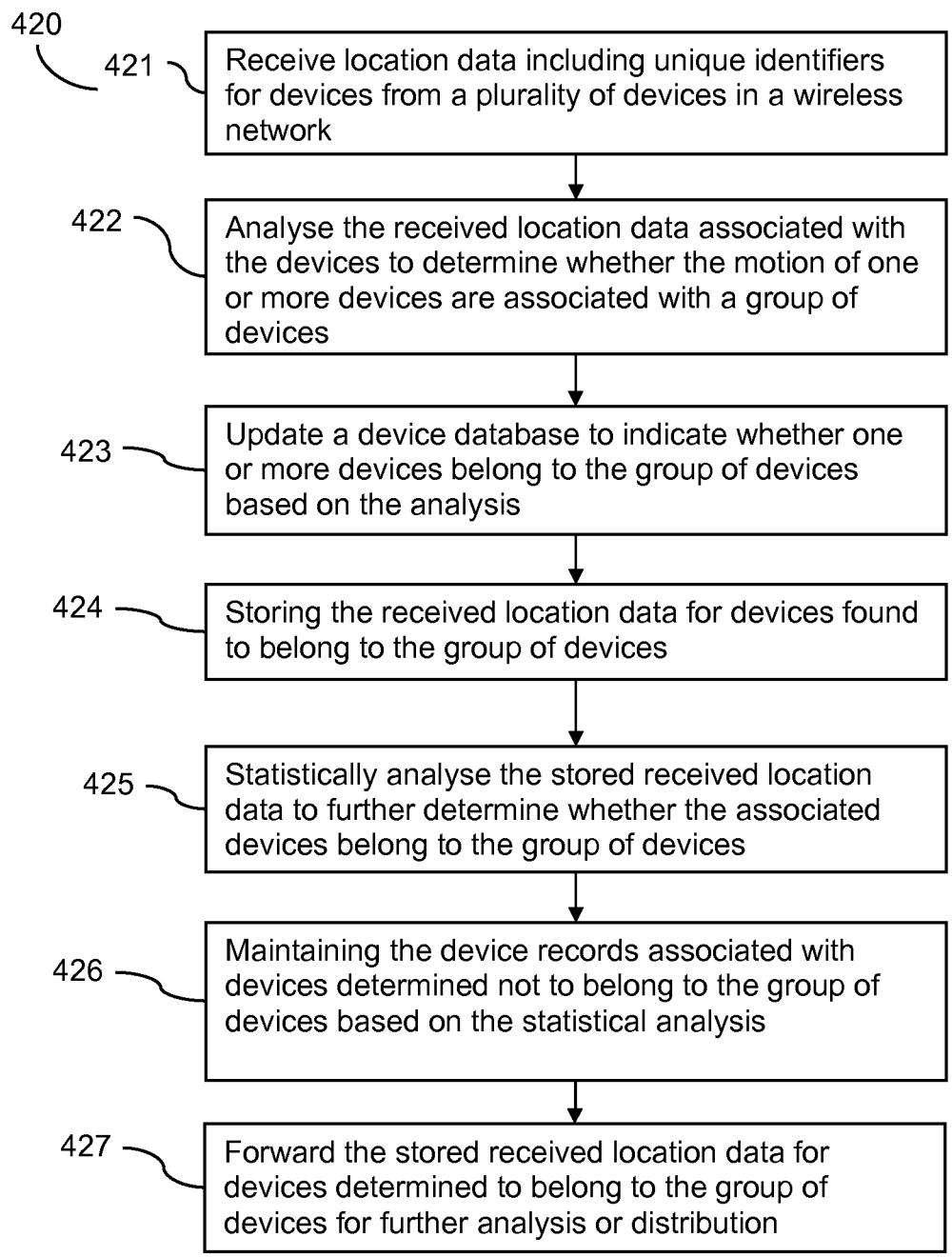
FIG. 4c is a flow diagram illustrating an example process for analysing location data according to the invention.

FIG. 4c is a flow diagram illustrating another example process 420 for use in filtering and collecting location data from a plurality of devices in a wireless network for use in a mobility analysis of a group of the devices. The process 420 is a method of operating a data collection apparatus such as, for example, data collection node 308a or 601 when filtering and collecting location data from the plurality of devices, the steps performed are as follows:

421. Receive location data including unique identifiers for one or more devices of the plurality of devices in the wireless network. Proceed to step 422.
422. Analyse the received location data from each of the one or more devices to determine whether said each device can be associated with the group of devices. As an example, the analysis may include analysing the device speed or distanced moved for each device to determine whether it is associated with the group of devices' device speeds or distances moved. Proceed to step 423.
423. Update a device database's device records to indicate whether or not each of the one or more devices belongs to the group of devices. Proceed to step 424.
424. Storing the received location data for devices found to belong to the group of devices. Proceed to step 425.
425. Performing a statistical analysis on the stored received location data to further determine whether the corresponding devices belong to the group of devices.
426. Maintaining the device records associated with devices determined not to belong to the group of devices based on the statistical analysis.
427. Forward the stored location data for devices determined to belong to the group of devices and/or devices that are relevant to the mobility analysis of the group of devices for use in the mobility analysis and/or for distribution.

When the processes 400, 410 and 420 include a device database with device records, it is to be appreciated that each device record associated with a device that does not belong to the group of devices may include a timestamp indicating when the device record indicated the associated device does not belong to the group of devices. The steps 402, 403, 411 and 426, may then include updating each device record to indicate the associated device belongs to the group of devices after a predetermined period of time has elapsed. The updating may be performed when it is determined the associated device has moved, and/or the updating may be performed if the device has moved and whether it is determined that the amount of movement etc is associated with the group of devices.

Figure 4D:
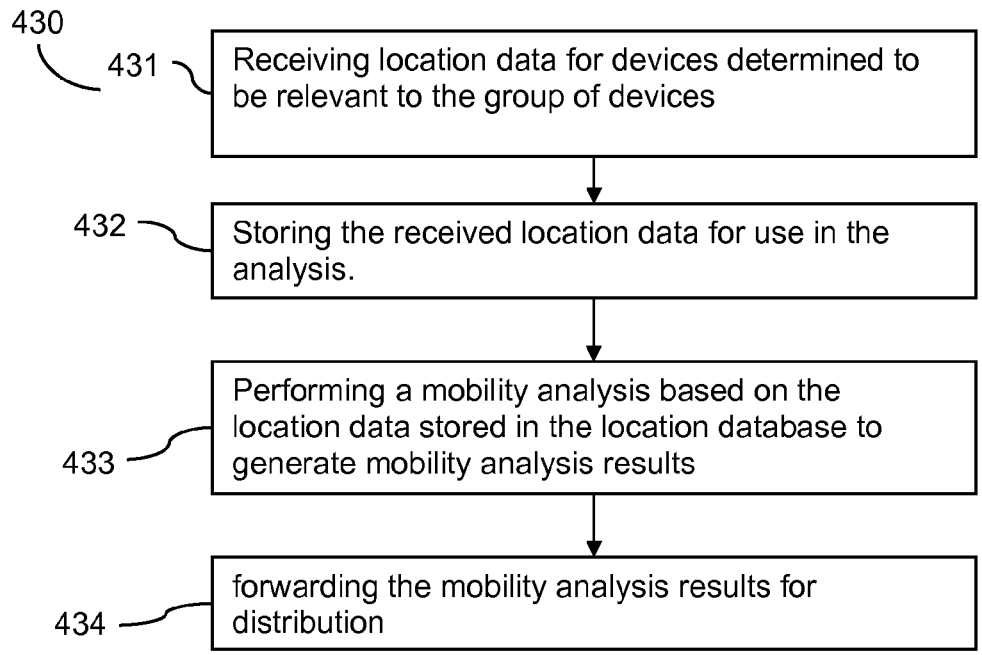
FIG. 4d is a flow diagram illustrating another example process for analysing location data according to the invention.

FIG. 4d is a flow diagram illustrating an example process 430 for use in analysing collected location data for a plurality of devices in a wireless network for use in a mobility analysis of a group of the devices. The process 430 is a method of operating a data analysis apparatus such as, for example, data analysis node 309a or 611 when analysing collected location data from the plurality of devices, the steps performed are as follows:
431. Receiving location data for devices determined to belong to the group of devices. Proceed to 432.
432. Storing the received location data for use during a mobility analysis of the group of devices. Proceed to 433.
433. Performing the mobility analysis based on the stored location data to generate mobility analysis results for the devices found to belong to the group of devices. Proceed to 434.
434. Forwarding the mobility analysis results for distribution. Proceed to 431.

Step 433 may be performed according to a first schedule. In addition, the process 430 may include a relevancy analysis step that may be performed according to a second schedule. The first and second schedules may be arranged such that the step of performing the relevancy analysis is less frequent than the step 433 of performing the mobility analysis. The relevancy analysis determines whether the devices associated with the stored received location data still belong to the group of devices and/or are relevant to the mobility analysis for the group of devices. Based on the relevancy analysis, device information is generated associated with one or more devices determined not to belong to the group of devices. The device information may include a list of the unique identifiers of devices determined not to belong to the group of devices and/or not relevant to the mobility analysis. The device information may be sent to processes 400 or 420 for use in updating the device lists, device databases, or for use in determining, based on the unique identifiers, whether the devices associated with the received location data belong to the group of devices.

Step 433 may further include creating mobility models based on the location data stored in the location database. As an example, the mobility models created may include a plurality of origination/destination matrices derived from the stored location data.

Figure 4E:
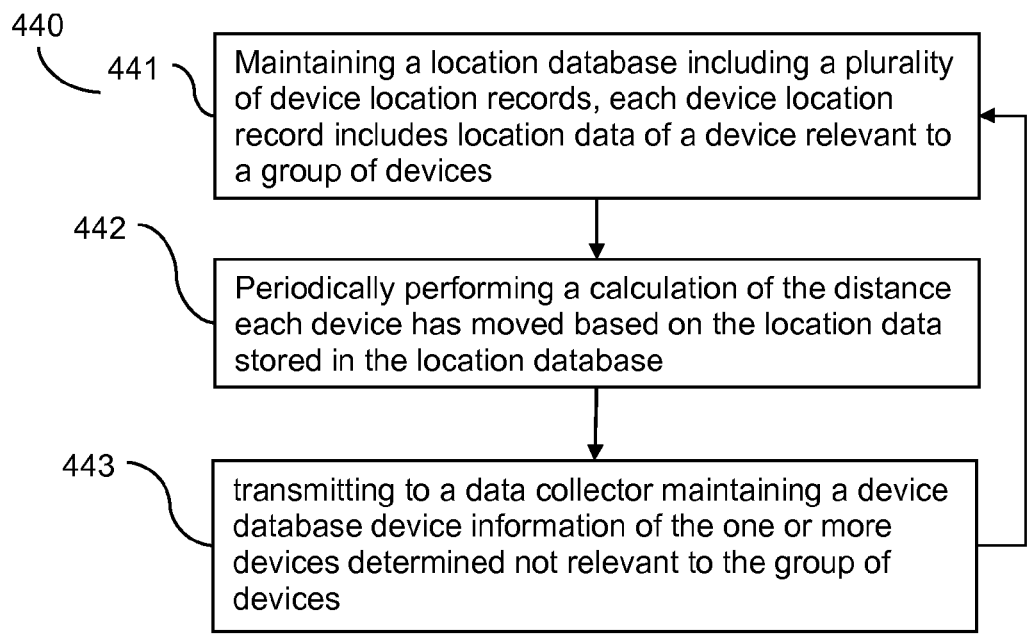
FIG. 4e is a flow diagram illustrating example process for calculating a distance a device has moved based on the location data according to the invention.

FIG. 4e provides an example process 440 for use with process 430, in which a location database including a plurality of device location records including location data of devices determined to belong to the group of devices. The process 440 includes the steps of:
441. Maintaining the location database based on the received location data.
442. Performing a relevancy analysis based on a calculation of the distance each device has moved based on the location data stored in the location database. The relevancy analysis may include comparing the calculated distance for each device with a distance threshold to determine whether each device belongs to the group of devices.
443. Transmitting, to a data collection device maintaining a device database, a list of devices, device information associated with one or more devices determined not to belong to the group of devices. The device information may include the unique identifiers from the location data for the devices determined not to belong to the group of devices. As an example, a device database may include a plurality of device records. Each device record indicates whether the device associated with the device record belongs to the group of devices. The device information is for use in updating each device record associated with the device information. Alternatively, the device information may be stored and simply used in the determination of whether the devices belong to the group of devices based on the unique identifier.

Figure 4F:
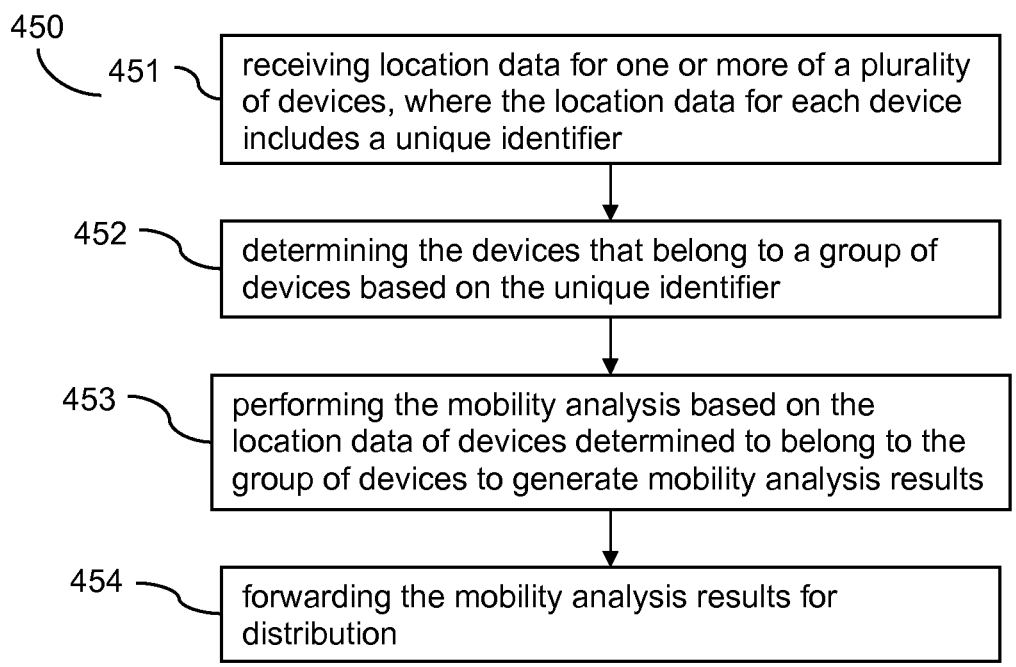
FIG. 4f is a flow diagram illustrating an example process for performing mobility analysis according to the invention.

FIG. 4f is a flow diagram illustrating an example process 450 for use in filtering, collecting and analysing collected location data for a plurality of devices in a wireless network for use in a mobility analysis of a group of the devices. The process 450 is a method of operating an apparatus such as, for example, data collection and analysis node 700, the steps performed are as follows:
451. Receiving location data for one or more of the devices, where the location data for each device includes a unique identifier.
452. Determining the devices that belong to the group of devices based on the unique identifier.
453. Performing the mobility analysis based on the location data of devices determined to belong to the group of devices to generate mobility analysis results.
454. Forwarding the mobility analysis results for further distribution.

As an example, the process 450 may include the steps of maintaining a device database including a plurality of device records, where each device record indicates whether the device associated with the device record belongs to the group of devices. Maintaining a location database including a plurality of device location records, where each device location record includes location data of a device determined to belong to the group of devices for use in the mobility analysis. The step 452 of determining may further include determining from the device database the devices that belong to group of devices based on the device identifier. The step 453 of performing the mobility analysis further includes performing the mobility analysis based on the location data stored in the location database.

In addition, the process 450 may include the steps of performing a relevancy analysis on the plurality of device location records to determine whether the associated devices belong to the group of devices. The step of maintaining the location database further includes removing each device location record associated with a device determined not to belong to the group of devices. The step of maintaining the device database further includes updating each device record associated with a device determined not to belong to the group of devices.

Regarding FIGS. 4a to 4f, the group of devices may include devices relating to one or more specific device types that are relevant to the mobility analysis. By way of example only, it is to be appreciated that the specific device types may include, but are not limited to, devices based on one or more of a non-stationary device(s), a stationary device(s), a device(s) carried by humans, and a device(s) carried by non-stationary vehicles.

There are many examples of classifying a device as having human or non-human device features or behaviour based on location data or location traces for the corresponding device. Devices having non-human device features or behaviour are devices that are not carried by humans e.g. devices carried by vehicles that communicate with the wireless network or stationary devices such as sensors or utility meters that may communicate with the wireless network (e.g. a mobile network). Conversely, devices having human device features or behaviour are devices that are carried by humans, e.g. any portable device capable of communicating with the wireless network e.g. mobile phones, net-books, laptops, portable digital assistants and the like.

Algorithms that can user location data for devices to check locations and calculate speed of movement of the devices can be used for determining whether a device has non-human device features or behaviour or human features or behaviour. Some devices that spend a long time being in a static state or have regular or constant speed characteristics are typically devices not carried by humans and so have non-human device behaviour. For example, some mobile monitoring equipment for transportation in cities, mobile equipment for engineering measurement in vehicles can spend the whole day in a static status or at a relatively constant speed. Devices with human device mobility features or behaviour typically do not have these characteristics. Devices that typically show human movement characteristics or behaviour (also referred to as human device features) typically generate complex speed patterns and also places visited.

As an example an algorithm using location data to detect devices having non-human device features or behaviour may include the following:
  Save all location data for each device for a period of time e.g. 3 days;
  For each device, if the device has not moved during this period of time mark it as non-human as it may be a stationary device such as a sensor;
  For each device, if the device has moved, then calculate the speed of movement. If the speed has been substantially constant during the period of time (e.g. 3 days) the device is most likely fixed on a vehicle, if so, mark it as non-human.

Devices having non-human device features or behaviour may be classified into two main types, 1) relative static devices, and 2) non-static devices. Relative static devices can have two primary features, a) the device can stay for a long time in one place, e.g. over 24 hours or longer, and b) may keep constant speed once moving. The other device type is non-static devices, which may have several features. The first feature is that the device may have different speed profiles or places, but still can be found based on analysis over longer time periods, e.g. a month or even year(s), to exhibit behaviour showing these devices have the same start place and end place during the period of time indicating a regular movement that is non-human, e.g. the device is fixed to a bus, train or other public transportation. The second feature is whether the device exhibits properties that are non-human e.g. moving is more than a threshold value (e.g. 20 hours) in the long run in one area. The third feature may be that the device enters or is in a location that a human should not access e.g. dangerous areas such as factories or other hazardous area, which can be set to determine whether a device exhibits non-human behaviour or features based on the location data.

Figure 5:
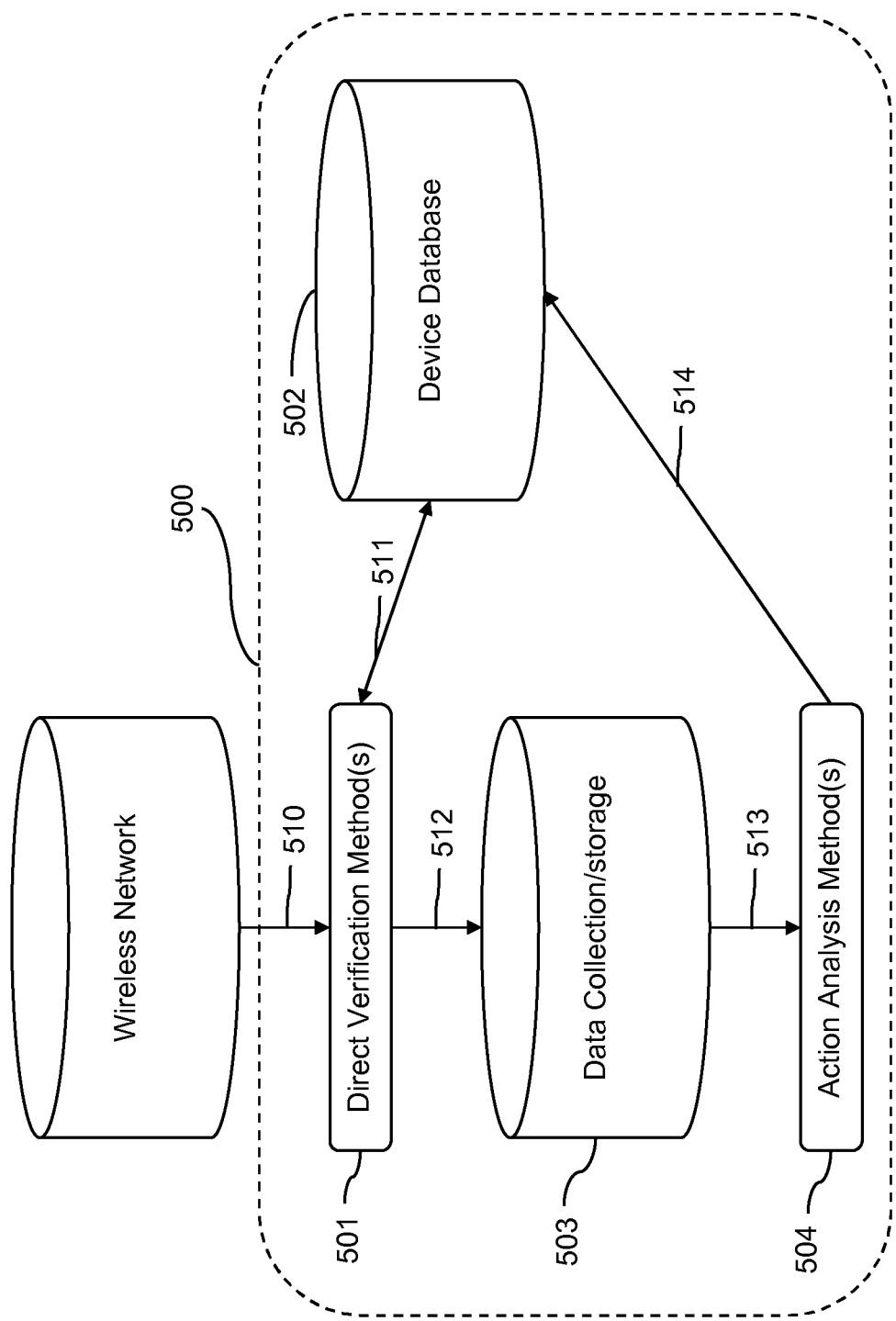
FIG. 5 is a schematic illustration of another example data collection and analysis system according to the invention.

FIG. 5 is a schematic illustration of another example data collection and analysis node 500 for use in a wireless network (e.g. a mobile network) according to the invention for use in a mobility analysis of one or more group(s) of devices. For simplicity, this example refers to one group of devices, it is to be appreciated that the data collection and analysis node 500 may collect location data for more than one group of devices for a mobility analysis. This example performs an online detection of devices that do not belong to the group of devices for the mobility analysis, these devices are non-relevant devices to the mobility analysis. The online process to detect non-relevant devices may be performed in real-time. The data collection node 500 includes a direct verification method(s) module (DVM) 501, which is in communication with a device database 502 and the data collection/storage 503. The data collection/storage 503 is coupled to an action analysis method(s) module 504 (AAM), which is in also in communication with the device database 502.

In operation, the data collection and analysis node 500 receives in step 510 location data for the plurality of devices from the wireless network via the DVM 501. All the received location data is filtered first by the DVM 501. The DVM 501 includes fast algorithms that can quickly analyse the location data and determine whether the location data for each device corresponds to a device that belongs to the group of devices for the mobility analysis.

In step 511, the DVM 501 also maintains the device database 502 for use in recording and querying whether a device belongs to the group of devices for the analysis. For example, if the group of devices are devices that exhibit human movement characteristics or behaviour, then the fast algorithms are configured to detect whether the received location data for a device exhibits human movement characteristics or behaviour such as a mobile phone (also referred to as a human device) or whether the location data is for a device that exhibits non-human movement characteristics or behaviour such as a fixed sensor or vehicle GPS system (also referred to as a non-human device). The DVM 501 can query the device database 502 to check whether the location data for the device corresponds to a non-human device, if this is the case, then the location data for this device is discarded. If the device is not in the device database 502, the DVM 501 can also compute and check whether the device speed is always the same, or use the above-mentioned algorithms to determine whether the device has non-human/human movement characteristics or behaviour. When the DVM 501 finds a device having non-human movement characteristics or behaviour that is not in the device database 502, it tags the device and includes a device record in the device database 502 indicating the device does not belong to the group of devices.

The DVM 501 will always keep running in data collection/filtering mode, during DVM computation, it can find some device related data, then save the device related data into the device database 502 to record the device features, e.g. this device has been at the same place for a long period of time, or has constant speed. The device database 502 can include device data and also device activity features in order to provide separate device data and in convenient to query device. The remaining location data that is not filtered out by the DVM 501 can be assumed, at this stage, to be for devices belonging to the group of devices.

In step 512, the remaining location data is passed to data collection/storage 503 and saved. The location data may be saved in a data collector location database (not shown). This location data is the location data for devices that the DVM 501 has determined to belong to the group of devices and may be retrieved and used for a mobility analysis. However, the location data for these devices may be further analysed and filtered so the device database 502 can be regularly updated.

In step 513, the stored location data for devices assumed to belong to the group of devices is passed to the AMM 504 for further analysis in updating the stored location data and the device database 502. The AAM 504 further filters the stored location data to detect any possible devices that should not belong to the group of devices, e.g. are non-human devices. The AAM includes analysis algorithms that generate data statistics (e.g. long term data statistics), which are analysed to verify whether the stored location data for each device exhibits the correct device movement characteristic or behaviour that is expected of devices belonging to the group of devices. The analysis may be performed over long term location data or data that has been collected over a long period of time.

For example, the AAM 504 may perform some of the following:
- A Trace loop routes algorithm may compute the route a device takes, if the device has been to the same places several times and keeps regular hours, the algorithm may conclude that the location data for the device exhibits a bus or train action characteristics or features over a long period of time. That is the device exhibits non-human movement characteristics.
- For suspicious devices, list every long time regular activity of the suspicious devices to study and possibly match the device as having non-human/human device features or characteristics. The analysis may be based on different statistical data and original/destination (O/D) routes over a period of time during the analysis.

In step 514, the AAM 504 sends device data related to devices that are found to not belong in the group of devices for updating or entering into the device database 502.

Instead of having a device database 502, in an alternative solution, the device information about non-interesting devices or devices not belonging to the group of devices may be recorded somewhere (in another node) within the wireless network such that the wireless network does not report any location data from these devices to the data collection and analysis node 500. The DVM 501 and AAM 504 may report the devices that are of interest or not of interest to the wireless network such that only location data from devices belonging to the group of devices is received from the wireless network.

Figure 6:
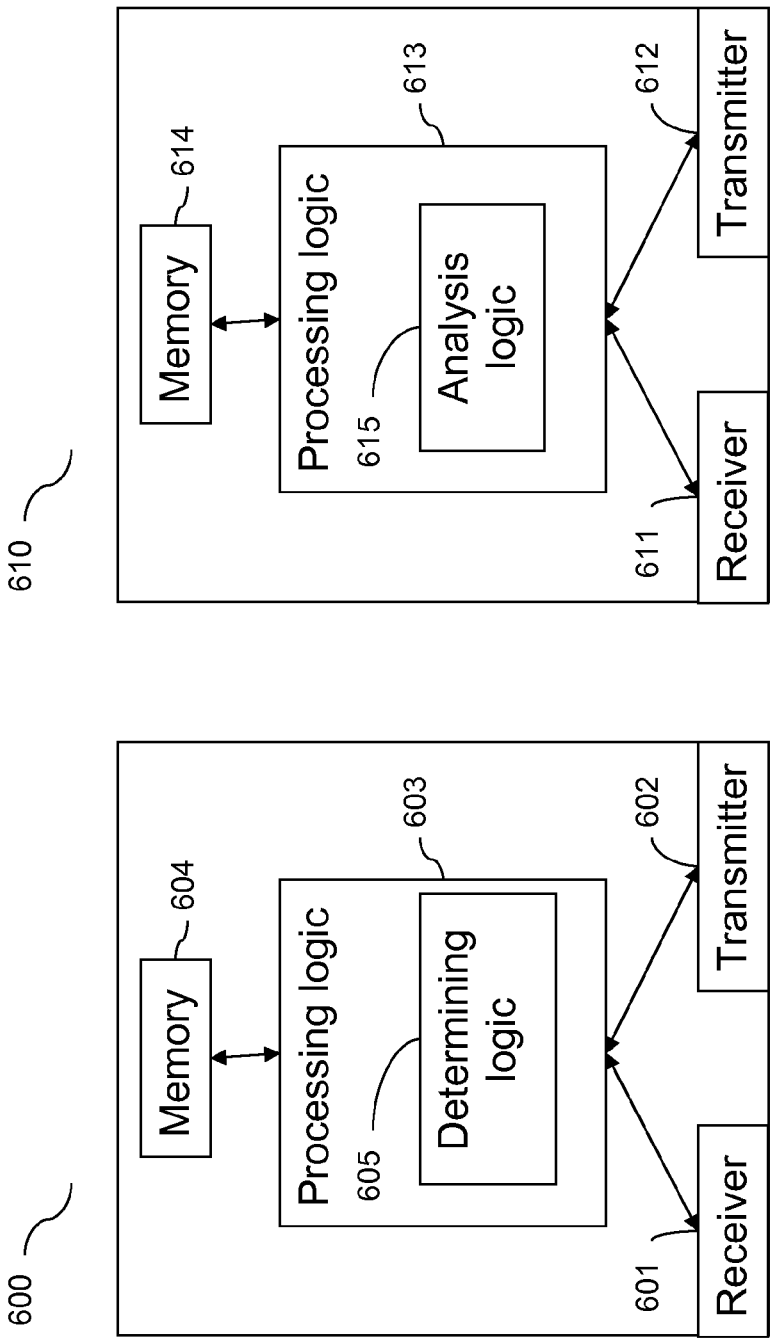
FIG. 6a is a schematic illustration of an example data collection apparatus according to the invention.
FIG. 6b is a schematic illustration of an example analysis apparatus according to the invention.

FIG. 6a illustrates an example apparatus 600 (e.g. a data collection node) for use in filtering location data for a plurality of devices 301a-301g in a wireless network (e.g. a mobile network 300) for use in a mobility analysis of a group of the devices 302a or 302b. For simplicity, the reference numerals of FIG. 3 will be used in relation to FIGS. 6a, 6b and 7 as an illustration. The apparatus 600 includes a receiver 601, a transmitter 602, a processor 603 and memory 604. The processor 603 being connected to the receiver 601, transmitter 602 and memory 604.

In operation, the receiver 601 is configured to receive location data for one or more of the devices 301a-301g, where the location data for each device includes a unique identifier. The processor 603 is further configured to determine 605 the devices that belong to the group of devices 302a or 302b based on the unique identifiers. The transmitter 602 is configured to forward the location data for devices that are determined to belong to the group of devices 302a or 302b to an analysis apparatus 309a or 610 for performing the mobility analysis.

When the processor 603 is configured to maintain a device database 308b including a plurality of device records, where each device record indicates whether the device associated with the device record belongs to the group of devices 302a or 302b, the processor 603 is further configured to query 605 the device database 308b using the unique identifiers to determine the devices that belong to the group of devices 302a or 302b. The receiver 601 is also further configured to receive, from the analyser apparatus 309a or 610, device information associated with whether one or more devices belong to the group of devices 302a or 302b. The processor 603 is further configured to update each device record associated with the device information to indicate whether the device associated with the device record belongs to the group of devices 302a or 302b.

FIG. 6b illustrates an example apparatus 610 or 309a for analysing location data for the plurality of devices 301a-301g in the wireless network (e.g. a mobile network 300) for use in a mobility analysis of a group of the devices 302a or 302b. The apparatus 610 includes a receiver 611, a transmitter 612, a processor 613 and memory 614. The processor 613 being connected to the receiver 611, transmitter 612 and memory 614.

In operation, the receiver 611 is configured to receive and store location data for devices determined to belong to the group of devices 302a or 302b. The processor 613 is further configured to perform the mobility analysis 615 based on the stored location data to generate mobility analysis results for the devices found to belong to the group of devices 302a or 302b. The transmitter 612 is configured to forward the mobility analysis results for further distribution.

When the processor 613 is further configured to maintain a location database 309b including a plurality of device location records, where each device location record includes location data of a device that belongs to the group of devices 302a or 302b, the receiver 611 is further configured to store the location data for devices determined to belong to the group of devices 302a or 302b in the location database 309b. The processor 613 is further configured to perform the mobility analysis 615 based on the stored location data in the location database 309b to generate mobility analysis results for the devices found to belong to the group of devices 302a or 302b.

The processor 613 may also be further configured to perform a calculation of the distance each device has moved based on the location data stored in the location database 309b. Based on the calculation, the processor 613 can be configured to compare the calculated distance for each device with a distance threshold to determine whether one or more devices belong to the group of devices 302a or 302b. The transmitter 612 is further configured to transmit, to the apparatus 600 or 308a for filtering as described with reference to FIG. 6a, device information associated with whether one or more devices are determined not to belong to the group of devices 302a or 302b, the device information for use by the apparatus 600 or 308a in determining the devices that belong to the group of devices based on the unique identifier.

Figure 7:
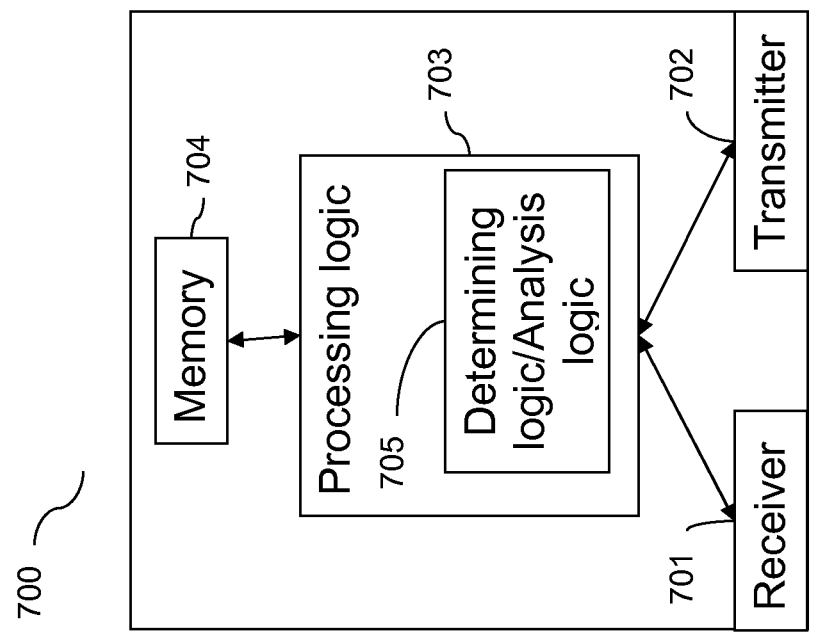
FIG. 7 is a schematic illustration of a data collection and analysis apparatus according to the invention

FIG. 7 illustrates an example apparatus 700 for filtering and analysing location data for a plurality of devices 301a-301g in a wireless network (e.g. a mobile network 300) for use in a mobility analysis of a group of the devices 302a or 302b. The apparatus 700 includes a receiver 701, a transmitter 702, a processor 703 and memory 704, the processor 703 being connected to the receiver 701, transmitter 702 and memory 704.

In operation, the receiver 701 is configured to receive location data for one or more of the devices 301a-301g, where the location data for each device includes a unique identifier. The processor 703 is further configured to determine 705 the devices that belong to the group of devices 302a or 302b based on the unique identifier. The processor 703 is also configured to store the location data for devices that belong to the group of devices 302a or 302b. The processor 703 is also configured to perform the mobility analysis 705 based on the stored location data to generate mobility analysis results for the group of devices 302a or 302b. The transmitter 702 is configured to forward the mobility analysis results for further distribution.

When the processor 703 is further configured to maintain a device database 308b including a plurality of device records, where each device record indicates whether the device associated with the device record belongs to the group of devices 302a or 302b, the processor is configured to determine 705 from the device database 308b the devices that belong to the group of devices 302a or 302b based on the unique identifier.

When the processor is configured to maintain a location database 309b including a plurality of device location records, where each device location record includes location data of a device determined to belong to the group of devices 302a or 302b for use in the mobility analysis. The processor is configured to perform the mobility analysis 705 based on the location data stored in the location database 309b. The processor is also configured to perform a relevancy analysis 705 on the plurality of device location records to determine whether the associated devices belong to the group of devices 302a or 302b. The processor 703 is configured to remove from the location database 309b each device location record associated with a device determined not to belong to the group of devices 302a or 302b, and update each device record to indicate whether the associated devices belong to the group of devices 302a or 302b.

The apparatus for filtering location data 600, apparatus for analysing collected location data 610, and apparatus for filtering and analysing location data 700 as herein described can include memory units 604, 614 and 704 and processors 603, 613 and 703, which can be used for storing and executing a computer program, comprising computer readable code which, when executed by the processors 603, 613 and 703, respectively, causes the apparatus 600, 610 and 700 to perform the relevant methods, procedures, or processes of the invention as described herein. Such computer programs as described herein can be incorporated within one or more computer program products, each comprising a computer readable medium and one or more of the computer programs, where one or more of the computer programs are stored on the computer readable medium.

Although some of the examples provided herein referred to mobile networks, this was by way of example only, and it will be appreciated by the person of skill in the art that the invention is not limited to only wireless networks but is applicable to any suitable wireless communication network from which location data may be collected and analysed according to the invention.

It will be appreciated by the person of skill in the art that various modifications may be made to the above described examples and/or embodiments without departing from the scope of the present invention.

The invention claimed is:

1. A method for filtering location data from a plurality of devices in a wireless network for use in a mobility analysis of a group of devices of one or more specific device types, the method comprising:
receiving location data from the devices, the location data from each device including a unique identifier;
determining the devices that belong to the group of devices of one or more specific device types and are relevant to the mobility analysis based on the unique identifier; and
forwarding the location data for those devices determined to belong to the group of devices to an analyser module for use in the mobility analysis;
performing, according to a first schedule, the mobility analysis based on the location data stored in a location database to generate mobility analysis results for the devices found to belong to the group of devices;
performing, according to a second schedule, a device relevancy analysis to determine whether each device belongs to the group of devices; and
updating a device database device records based on device information associated with one or more devices determined not to belong to the group of devices to indicate whether each device belongs to the group of devices.

2. The method according to claim 1, further comprising:
maintaining the device database including a plurality of device records, wherein each device record indicates whether the device associated with the device record belongs to the group of devices; and
wherein determining the devices that belong to the group of devices further comprises querying the device database using the unique identifiers to determine the devices that belong to the group of devices.

3. The method according to claim 2, wherein maintaining the device database further comprises:
receiving, from the analyser module, device information associated with one or more devices determined not to belong to the group of devices; and
updating each device record associated with the device information to indicate the device associated with the device record does not belong to the group of devices.

4. The method according to claim 2, wherein maintaining the device database further comprises:

receiving, from the analyser module, device information associated with one or more devices determined to belong to the group of devices; and updating each device record associated with the device information to indicate the device associated with the device record belongs to the group of devices.

5. The method according to claim 2, wherein maintaining the device database further comprises:

receiving, from the analyser module, device information associated with one or more devices indicating whether the one or more devices are relevant to the mobility analysis of the group of devices; and updating each device record associated with the device information to indicate whether the device associated with the device record is relevant to the mobility analysis.

6. The method according to claim 2, wherein determining comprises:

identifying a device record associated with the unique identifier of the location data from each device; and checking the identified device record indicates whether the associated device belongs to the group of devices.

7. The method according to claim 2, wherein determining comprises:

identifying a device record associated with the unique identifier of the location data from each device; and checking the identified device record indicates whether the associated device is relevant to the mobility analysis of the group of devices.

8. The method according to claim 1, further comprising:

analysing the received location data from each device to determine whether said each device can be associated with the group of devices.

9. The method according to claim 8, wherein analysing the received location data includes analysing the device speed for each device to determine whether it is associated with the group of devices' device speeds.

10. The method according to claim 8, further comprising: storing the received location data for devices found to belong to the group of devices.

11. The method according to claim 10, further comprising:

performing a statistical analysis on the stored received location data to further determine whether the corresponding devices belong to the group of devices; and maintaining device records associated with devices determined not to belong to the group of devices based on the statistical analysis.

12. The method according to claim 2, wherein each device record associated with a device that does not belong to the group of devices includes a timestamp indicating when the device record indicated the associated device does not belong to the group of devices, and wherein maintaining the device database further includes updating each device record to indicate the associated device belongs to the group of devices after a predetermined period of time has elapsed.

13. The method according to claim 12, wherein updating each device record to indicate the associated device belongs to the group of devices is performed when it is determined the associated device has moved.

14. The method according to claim 1, wherein the specific device type comprise at least one of:

a device carried by humans; and
a device carried by non-stationary vehicles; and
stationary devices.

15. A method for analysing collected location data for a plurality of devices in a wireless network for use in a mobility analysis of a group of the devices, the method comprising:

maintaining a location database including a plurality of device location records, wherein each device location record includes location data of a device belonging to the group of devices;

receiving and storing location data for devices determined to belong to the group of devices in the location database;

performing, according to a first schedule, the mobility analysis based on the location data stored in the location database to generate mobility analysis results for the devices found to belong to the group of devices;

performing, according to a second schedule, a calculation of the distance each device has moved based on the location data stored in the location database;

comparing the calculated distance for each device with a distance threshold to determine whether each device belongs to the group of devices; and transmitting, to a data collection device maintaining a device database, device information associated with one or more devices determined not to belong to the group of devices, wherein the device database includes a plurality of device records, each device record indicates whether the device associated with the device record belongs to the group of devices and wherein the device information is for use in updating each device record associated with the device information.

16. The method according to claim 15, wherein the first and second schedules are arranged such that performing a calculation of the distance each device has moved is performed less frequently than performing the mobility analysis to generate mobility analysis results.

17. The method according to claim 15, wherein performing the mobility analysis to generate mobility analysis results includes creating mobility models based on the location data stored in the location database.

18. The method according to claim 17, wherein the mobility models created include a plurality of origination/destination matrices derived from the stored location data.

19. The method according to claim 15, further comprising: distributing the mobility analysis results.

20. The method according to claim 15, wherein the group of devices includes devices relating to one or more specific device types that are relevant to the mobility analysis.

21. The method according to claim 20, wherein the specific device type comprise at least one of:

a device carried by humans;
a device carried by non-stationary vehicles; and
a stationary device.

22. A method for filtering, collecting and analysing location data for a plurality of devices in a wireless network for use in a mobility analysis of a group of devices of one or more specific device types, the method comprising:

receiving location data for one or more of the devices, wherein the location data for each device includes a unique identifier;

determining the devices that belong to the group of devices of one or more specific device types and are relevant to the mobility analysis based on the unique identifier; and performing the mobility analysis based on the location data of devices determined to belong to the group of devices to generate mobility analysis results;

forwarding the mobility analysis results for further distribution;

performing, according to a second schedule, a device relevancy analysis to determine whether each device belongs to the group of devices; and updating a device database device records based on device information associated with one or more devices determined not to belong to the group of devices to indicate whether each device belongs to the group of devices.

23. The method according to claim 22 further comprising:

maintaining the device database including a plurality of device records, wherein each device record indicates whether the device associated with the device record belongs to the group of devices; and maintaining a location database including a plurality of device location records, wherein each device location record includes location data of a device determined to belong to the group of devices for use in the mobility analysis; wherein:

wherein determining further includes determining from the device database the devices that belong to group of devices based on the unique identifier; and wherein performing the mobility analysis further comprises performing the mobility analysis based on the location data stored in the location database.

24. The method according to claim 23, further comprising:

wherein maintaining the location database further comprises removing each device location record associated with a device determined not to belong to the group of devices; and wherein maintaining the device database further comprises updating each device record associated with a device determined not to belong to the group of devices.

* * * * *